United States Patent [19]

Lai et al.

[11] Patent Number: 4,843,118
[45] Date of Patent: Jun. 27, 1989

[54] ACIDIZED FRACTURING FLUIDS CONTAINING HIGH MOLECULAR WEIGHT POLY(VINYLAMINES) FOR ENHANCED OIL RECOVERY

[75] Inventors: Ta-Wang Lai, Allentown; Bheema R. Vijayendran, Emmaus, both of Pa.

[73] Assignee: Air Products and Chemicals, Inc., Allentown, Pa.

[21] Appl. No.: 64,962

[22] Filed: Jun. 19, 1987

Related U.S. Application Data

[63] Continuation-in-part of Ser. No. 914,046, Oct. 1, 1986.

[51] Int. Cl.$^4$ .............................................. C08F 8/00
[52] U.S. Cl. .................................. 524/555; 525/328.2
[58] Field of Search ................ 525/328.2; 524/555; 252/8.55 C, 8.55 D

[56] References Cited

U.S. PATENT DOCUMENTS

| | | | |
|---|---|---|---|
| 2,982,749 | 5/1961 | Friedrich et al. | 260/23 |
| 3,278,506 | 11/1966 | Chamot et al. | 260/89.7 |
| 3,284,393 | 11/1966 | Vanderhoff et al. | 260/29.6 |
| 3,558,581 | 1/1971 | Beerman et al. | 260/89.7 |
| 3,597,314 | 8/1971 | Laube et al. | 162/168 |
| 3,957,739 | 5/1976 | Cabestany et al. | 526/207 |
| 3,975,341 | 8/1976 | Trapasso | 526/303 |
| 4,018,826 | 4/1977 | Gless et al. | 260/583 |
| 4,078,133 | 3/1978 | Ozima | 526/80 |
| 4,217,214 | 8/1980 | Dubin | 210/52 |
| 4,312,969 | 1/1982 | Becker et al. | 526/206 |
| 4,421,602 | 12/1983 | Brunnmueller et al. | 162/168.2 |
| 4,500,437 | 2/1985 | Englehardt et al. | 252/8.55 C |
| 4,623,699 | 11/1986 | Brunnmueller et al. | 525/355 |

FOREIGN PATENT DOCUMENTS 2152929  8/1985  United Kingdom .

OTHER PUBLICATIONS

D. J. Dawson et al., "Polyvinylamine Hydrochloride Synthesis and Utilization for the Preparation of Water-Soluble Polymeric Dyes"—J. Am. Chem. Soc. 98:19, 5996, (1976).

R. H. Summerville et al., "Synthesis of N-vinyl Acetamide and Preparation of Some Polymers & Copolymers", Polym. Reprints, 24-12, (1983).

Primary Examiner—Joseph L. Schofer
Assistant Examiner—Bernard Lipman
Attorney, Agent, or Firm—Michael Leach; William F. Marsh; James C. Simmons

[57] ABSTRACT

The inverse emulsion polymerization of a monomer of the formula

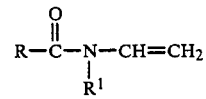

wherein R and $R^1$ represent hydrogen or a $C_1$-$C_4$ alkyl group, using a surfactant system having a hydrophilic-lipophilic balance value from 4 to 9, an azo-type free radical initiator and certain hydrocarbon liquids to yield a water-in-oil emulsion of a homopolymer of at least $10^6$ average molecular weight, the emulsion having a viscosity less than 10 cps, at 15% solids, 60 rpm Brookfield and 20° C.

Also disclosed is the preparation of poly(vinylamines) of at least $10^6$ average molecular weight by acid or base hydrolysis of the homopolymer emulsion.

Also disclosed are enhanced oil recovery compositions, drilling mud compositions, cements for drilling holes, completion fluids, acidized fracturing fluids, and wet-end paper additives containing the poly(vinylamines) and demonstrating superior properties.

10 Claims, No Drawings

ACIDIZED FRACTURING FLUIDS CONTAINING HIGH MOLECULAR WEIGHT POLY(VINYLAMINES) FOR ENHANCED OIL RECOVERY

CROSS-REFERENCE TO RELATED APPLICATIONS

This application is a continuation-in-part of copending application Ser. No. 914,046 filed Oct. 1, 1986.

TECHNICAL FIELD

The invention relates to the use of high molecular weight poly(vinylamines) in acidized fracturing fluids compositions.

BACKGROUND OF THE INVENTION

Water soluble polymers such as poly(N-vinylamides), frequently require high molecular weight to develop satisfactory properties for high performance applications. Low to medium molecular weight poly(N-vinylformamide) and poly(N-vinylacetamide) have been prepared by conventional solution polymerization in water and alcohols using oil-soluble and water-soluble initiators. However, poly(N-vinylamides) of high molecular weight are difficult to produce by conventional solution polymerization in that the polymer product obtained under useful conditions is a gel which is difficult to handle. In addition, problems with high solution viscosity and poor heat transfer make such synthesis impractical on a commercial scale.

Nonetheless, it was believed by the present inventors that the applications performance of poly(vinylamides) and poly(vinylamines) could be enhanced by the preparation and use of homopolymers of very high molecular weight ($>10^6$).

U.S. Pat. No. 4,500,437 discloses acrylamide copolymers and terpolymers containing N-vinylformamide and N-vinylacetamide prepared by inverse emulsion polymerization in Examples 67–70 with the polymers of Examples 68 and 70 having a molecular weight below 100,000; i.e. $<10^5$. Example 20 shows the preparation of poly(vinylformamide) by solution polymerization.

U.S. Pat. No. 4,421,602 discloses linear basic polymers containing from 90 to 10 mole % of copolymerized vinylamine units and from 10 to 90 mole % of copolymerized N-vinylformamide units. This patent teaches that the polymers can be prepared by solution polymerization in water, a water-soluble solvent or a mixture of water and a water-soluble solvent and actually shows such solution polymerization in the examples. It is suggested that the polymerization can also be carried out as a water-in-oil emulsion polymerization in a water-immiscible solvent, but there are no examples of such polymerization.

U.S. Pat. No. 4,018,826 discloses the preparation of poly(vinylamine) salts of mineral acids by polymerizing vinylacetamide with a free radical polymerization catalyst, and hydrolyzing the poly(vinylacetamide) to the desired amine salts by contacting the poly(vinylacetamide) with an aqueous solution of the corresponding mineral acid. Poly(vinylamine) product of about 3,000 to about 700,000 molecular weight (4,000 to about 1,000,000 for the salt product) is suggested.

U.S. Pat. No. 3,558,581 discloses homo- and copolymers of N-vinyl-N-methyl-amine by hydrolysis of the corresponding polymers of N-vinyl-N-methylformamide with mineral acids.

U.S. Pat. No. 3,597,314 discloses a water-soluble polymer consisting essentially of units derived from N-vinyl-N-methylformamide having 60–100% of the formic acid radicals of the polymer split off by acid hydrolysis. There is no disclosure regarding inverse emulsion polymerization.

GB No. 2,152,929 is directed to a process for producing N-substituted formamides for use in producing N-vinylformamide by thermally decomposing N-(alpha-alkoxyethyl)formamide in the gas phase. It is suggested that the N-vinylformamide can be bulk polymerized, solution polymerized using an aqueous solution or an organic solution, or emulsion polymerized singly or together with a monomer used conventionally for producing water-soluble polymers suitable for making flocculants, in the presence of a polymerization initiator of azo compounds. The thus obtained poly(vinylformamide) is hydrolyzed under acidic or basic conditions to obtain a cationic polymer of poly(vinylamines).

D. J. Dawson, et al., "Poly(vinylamine hydrochloride). Synthesis and Utilization for the Preparation of Water-Soluble Polymeric Dyes," J. Am. Chem. Soc., 98:19, 5996 (1976) discloses the preparation of N-vinylacetamide and its polymerization in solution followed by acid hydrolysis to poly(N-vinylamine hydrochloride).

Representative of the numerous prior art references relating to water-in-oil emulsion polymerization of water-soluble monomers are the following patents: U.S. Pat. Nos. 2,982,749; 3,278,506; 3,284,393; 3,957,739; 3,975,341; 4,078,133; and 4,312,969.

R. H. Summerville, et al., "Synthesis of N-vinyl Acetamide and Preparation of Some Polymers and Copolymers," Polym. Reprints, 24, 12 (1983) discloses that the inverse emulsion polymerization of N-vinylacetamide initiated by sodium persulfate in water and cyclohexane using Igepal surfactants was tried without success.

U.S. Pat. No. 4,217,214 discloses that polyvinylamine hydrochloride having a molecular weight of about $5 \times 10^5$ or greater has been found to be particularly effective as a flocculating agent in wastewater systems. The examples disclose the use of a poly(vinylamine) hydrochloride having a molecular weight of $2 \times 10^6$ and state that the poly(vinylamine) hydrochloride used is prepared as described in U.S. Pat. No. 4,018,826.

U.S. Pat. No. 4,623,699 discloses linear, basic polymer powders which contain units of the formula —CH$_2$—CH(NH$_2$)— and have a Fikentscher K value from 10 to 200 are prepared by eliminating the formyl groups from N-vinylformamide polymer powders with a gaseous hydrogen halide in the presence of not more than 5% by weight, based on the polymer used, of water.

JP No. 61/141712 discloses a method for producing N-vinylcarboxylic acid amide polymers by a procedure in which an aqueous solution of N-vinylcarboxylic acid amide is dispersed in a hydrocarbon-type dispersing medium using an oil-soluble polymer dispersion stabilizer followed by radical polymerization.

SUMMARY OF THE INVENTION

According to the present invention, very high molecular weight poly(N-vinylamides) can be prepared by an inverse emulsion polymerization process. The present invention provides an inverse homopolymer emulsion consisting essentially of 10–70 wt % of an aqueous solution containing 10-90 wt % of a homopolymer of an N-vinylamide of the formula

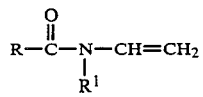

wherein R and $R^1$ represent hydrogen or a $C_1$-$C_4$ alkyl group, colloidally dispersed in a hydrocarbon liquid which is a $C_5$-$C_{10}$ alkane and, in addition, toluene and xylene when R=alkyl, a xylene compound, the homopolymer being at least $10^6$ average molecular weight and the emulsion possessing a viscosity less than 10 cps at 15% solids, 60 rpm Brookfield (7.9 sec$^{-1}$) and 20° C.

The method for preparing the inverse, or water-in-oil, emulsion involves colloidally dispersing an aqueous solution containing 10-90 wt % water-soluble N-vinylamide of the above formula in the hydrocarbon liquid using a surfactant having an HLB value from 4 to 9, the weight ratio of monomer-containing aqueous solution to hydrocarbon liquid being preferably in the range from 1:2 to 2:1, and polymerizing the monomer using an azo-type free radical initiator.

The resultant very high molecular weight polymer emulsion has a low viscosity ranging from 2 to less than 10 cps at 15% solids, 60 rpm Brookfield and 20° C., thus eliminating problems of solution viscosity which arise when the polymer is prepared by a solution polymerization process. In addition, the low viscosity homopolymer emulsion is easy to handle and can be used directly.

One such use of the vinylamide homopolymer emulsions is in the preparation of vinylamine homopolymers of at least a $10^6$ average molecular weight by acid or base catalyzed hydrolysis of the homopolymer, preferably as the emulsion. The use of the mineral acid in the hydrolysis step or in acidifying the base hydrolysis product provides the poly(vinylamine) as the salt of such acid.

The very high molecular weight, water-soluble poly(N-vinylamides) and the derived poly(vinylamines) have applications in the fields of water treatment, enhanced oil recovery and papermaking. For example, the derived poly(vinylamines) can be used as an important component in oil field chemical compositions such as drilling mud compositions, cements for drilling holes, completion fluids, and acidized fracturing fluids. Solution rheology (thickening efficiency and viscosity response to shear rates in the range of 1 to 1,000 sec$^{-1}$) of the poly(vinylamines) at a 0.5 to 1% concentration in low level salt solutions e.g. 2% KCl solution, is important in oil field chemical compositions for many applications. The very high molecular weight of the polymers affords better viscoifying and rheology.

In enhanced oil recovery (EOR) applications the poly(vinylamines) of the invention provide compositions having improved viscosity stability at 90° C. and improved viscosity retention in sea water. Most commercially available polymers fail under both these conditions. Hydrolyzed polyacrylamides fail in sea water solution at elevated temperatures due to precipitation of the polymer in the presence of calcium ions in the sea water. Xanthan polymer is insensitive to calcium ions. However, at high temperatures the polymer chains uncoil and lose their viscosifying efficiency.

In general such EOR compositions would comprise sea water containing about 1000 to 2000 ppm of the poly(vinylamine) and have a 10 to 20 cps Brookfield viscosity at 7.9 sec$^{-1}$ (60 rpm) and 90° C. Very high molecular weight vinylamine polymers according to the invention seem to show improved stability at high temperature and calcium salinity—a set of conditions useful in high temperature EOR viscosifying applications.

When used in acidized fracturing fluids, the poly(vinylamines) of the invention result in improved viscosity stability in concentrated hydrochloric acid solution at 70° C. Most commercial cellulosic polymers currently used in this application fail due to the breakdown of the polymer backbone under these conditions. Such fluids comprise about 0.2 to 2% poly(vinylamine) and 5 to 28% aqueous hydrochloric acid and have a FANN 35 viscosity of 10 to 100 cps at 300 rpm, 510 sec$^{-1}$ and $R_1B_1$ sensor.

Thus there is also provided a process for well stimulation by fracture acidizing with an aqueous acidic solution wherein the acidic solution is injected into the well to contact a formation under pressure sufficient to fracture the formation, the acidic solution containing as a viscosifier a vinylamine homopolymer having a molecular weight greater than $10^6$.

A further embodiment of the present invention is a drilling mud composition with good rheology. Such drilling mud compositions comprise 0.1 to 1 wt % poly(cinylamine), 0 to 10 wt % salt and 0.5 to 5 wt % clay dispersed in water.

Also provided by the invention are completion fluids exhibiting high viscosity in saturated brine solution as well as high temperature viscosity stability. A typical completion fluid comprises a saturated salt solution containing 0.2 to 2 wt % poly(vinylamine).

The present invention also provides an increase in retention, drainage rate and flocculation in a papermaking process comprising the deposition of a pulp stock to form a nonwoven sheet by adding to the pulp stock poly(vinylamines) according to the invention.

DETAILED DESCRIPTION OF THE INVENTION

Poly(N-vinylamides) of molecular weight at least $10^6$, preferably $3 \times 10^6$ to $15 \times 10^6$, are prepared via an inverse emulsion polymerization process by reacting the following composition under an inert atmosphere:
1. water-soluble N-vinylamide monomer,
2. water,
3. hydrocarbon liquid,
4. water-in-oil emulsifying agent, and
5. a nitrogen-containing free radical initiator.

The aqueous solution comprising the first two components contains 10 to 90 wt %, preferably 50 to 70 wt %, of a water-soluble N-vinylamide of the formula

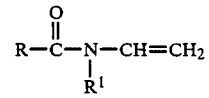

where R and $R^1$ represent hydrogen or an alkyl group having 1-4, preferably 1-2, carbon atoms, especially a methyl group. The weight ratio of monomer-containing aqueous solution to hydrocarbon liquid may be varied widely depending upon the monomer used, but preferably is about 1:2 to 2:1.

The suitable hydrocarbon liquids for use in the invention are immiscible with water and do not significantly dissolve the monomers in the presence of water. Such hydrocarbon liquids are exemplified by acyclic and cyclic $C_5$–$C_{10}$ alkanes such as hexane, octane, decane, and decahydronaphthalene (decalin) and, in addition, certain aromatic hydrocarbons for N-vinylacetamides and the aromatic hydrocarbons to toluene and xylene. Contemplated as a functional equivalent of toluene and xylene when R is an alkyl group in the monomer formula are ethylbenzene and tetrahydronaphthalene (tetraline). The preferred hydrocarbon liquids are the $C_5$–$C_{10}$ acyclic alkanes.

The stabilizing system comprises suitable emulsifying agents, or surfactants, having a hydrophilic-lipophilic balance (HLB) value from 4 to 9, preferably 4 to 7.5, and include sorbitan fatty acid esters such as sorbitan monostearate, oleate, laurate or palmitate; polyoxyethylenesorbitan fatty acid esters, i.e. reaction products of one mole of the aforementioned sorbitan fatty acid esters with from 4 to 40 moles of ethylene oxide; polyoxyethylene sorbitol esters of fatty acids; and mixtures thereof. The preferable quantity of surfactant is 5 to 20 wt % based on the monomer-containing aqueous solution.

The free radical initiator should be one of the azo compounds well known in the polymerization art such as 2,2'-azobis(isobutyronitrile); 2,2'-azobis(2-amidinopropane0)hydrochloride; 4,4'-azobis(4'-cyanopentanoic acid) and the like. Persulfates and hydrogen peroxide have been found not to be suitable in practicing the invention. Redox catalyst systems may also be used comprising the azo initiators with a reducing agent typically used in the art. The amount of free radical initiator can be varied widely depending upon reaction temperatures, rate of polymerization, degree of polymerization to be obtained, but preferably is in the range of 0.001 to 0.5 mole % of the monomer used.

The polymerization is usually carried out under an inert atmosphere, preferably under nitrogen. The reaction temperature is preferably in the range of 40°–60° C. A high temperature, i.e. >60° C., may cause side reactions unfavorable to the polymer such as crosslinking or chain transfer. A lower temperature may be impractical because of long reaction times.

The homopolymer product can be isolated from the emulsion by adding a flocculating agent and filtering. The precipitated product is then washed and dried. Generally, a polar organic solvent which is a good solvent for the surfactant but a poor solvent for the polymer, e.g. acetone, is used to aggregate the polymer. The precipitated polymer is filtered and washed to remove the surfactant. The dried and purified polymer of very high molecular weight is in the form of a fine powder and is water soluble.

The vinylamide homopolymer products are hydrolyzed to vinylamine homopolymers of at least $10^6$ average molecular weight in the presence of acids or bases. More desirably, vinylamine homopolymers of $1.8 \times 10^6$ to $9 \times 10^6$ molecular weight or more are obtained. The vinylamine homopolymers suitable for use in acidized fracturing fluids are greater than about 50% hydrolyzed, preferably greater than about 90%, to about 99+% hydrolyzed.

Suitable acids for the hydrolysis include mineral acids such as hydrochloric, hydrobromic, sulfuric, phosphoric and perchloric acid; and organic acids such as trifluoroacetic acids and methanesulfonic acid. The bases which can be employed include alkali and alkaline earth hydroxides such as sodium hydroxide, potassium hydroxide, calcium hydroxide and barium hydroxide; and quaternary ammonium hydroxides such as tetramethyl ammonium hydroxide. The quantity of the acid or base required may vary widely, depending upon the degree of hydrolysis desired and reaction conditions. Approximately, 1 to 3 equivalents of the acid or base per equivalent of the polymer is preferred to achieve essentially complete hydrolysis.

The hydrolysis can be performed in various solvents, including water; liquid ammonia; alcohols such as methanol, ethanol, isopropanol, and t-butanol; amines such as methylamine, dimethylamine, ethylamine and the like; and hydroxy amines such as ethanolamine. However, it is much preferred to simply add the acid or base in water to the water-in-oil emulsion.

The temperature of the hydrolysis may range from 20 to 200° C. depending upon the type of polymer and hydrolysis employed. Generally, hydrolysis proceeds more rapidly for poly(N-vinylformamide) than for poly(N-vinylacetamide). Thus, hydrolysis of poly(N-vinylformamide) can be carried on under milder conditions, i.e. at lower temperatures and shorter reaction times than for poly(N-vinylacetamide). The preferable temperature range of a base hydrolysis is 70 to 100° C. which is lower than that of acid or base hydrolysis of N-vinylacetamide in the range of 110 to 200° C.

The hydrolyzed polymer products thus obtained comprise the repeating free amino-containing units of the formula

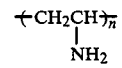

in the case of base hydrolysis, and amino-containing units of the formula

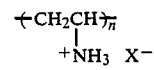

in the case of acid hydrolysis, where $X^-$ represents the anion corresponding to the acid employed in the hydrolysis.

Poly(vinylamine) is preferably isolated in the salt form to prevent adsorption of atmospheric carbon dioxide. The polymer salt is isolated by acidifying the hydrolysis mixture to cause the polymer to precipitate. The precipitated polymer generally is a gum, but a fibrous material can be obtained after redissolving, followed by reprecipitation in methanol.

The products of this invention are high molecular weight poly(N-vinylamides), especially poly(N-vinylformamide) of $3–15 \times 10^6$ mol wt and poly(N-vinylacetamide) of $1.3–5 \times 10^6$ mol wt, and the derived poly(vinylamine) and poly(vinylamine) salts.

These polymeric materials, which may also contain up to 25 wt % copolymerizable monomers such as, for example, acrylamide and N-vinylpyrrolidone, provided the polymer maintains sufficient water solubility, are particular useful as flocculants, retention agents, and thickeners in the areas of water treatment, enhanced oil recovery and papermaking. These polymers may also be used as corrosion inhibitors, photographic chemicals, surfactants, protein hardeners, ion exchange resins, and as ingredients in the preparation of drugs, food dyes, herbicides and pesticides.

With regard to acidized fracturing fluids for well stimulation, such compositions would comprise 0.2 to 2%, preferably about 0.5%, high molecular weight poly(vinylamine) according to the invention as a viscosifier in 5 to 28% aqueous hydrochloric acid and optionally 0.5 to 1% crosslinking agent, based on weight of poly(vinylamine). Suitable crosslinking agents include, for example, organic titanate complexes, epichlorohydrin, hexamethylene diisocyanate, glyoxal, butylene diol diacrylate, terephthalaldehyde and glutaraldehyde with the latter two preferred at lower pH. The fracturing fluid compositions should have a FANN 35 viscosity of 10 to 100 cps at 300 rpm, 410 sec$^{-1}$ and $R_1 B_1$ sensor.

These acidized fracturing fluids are injected under pressure into a well to contact a formation. The pressure must be sufficient to fracture the formation.

EXAMPLE 1

This Example shows a preparation of a very high molecular weight poly(N-vinylformamide) by inverse emulsion polymerization.

Sorbitan monostearate (SPAN 60 surfactant, HLB 4.7, 2.5g) was dissolved in octane (90g) and the resulting solution was transferred to a reaction kettle. The reactor was purged with nitrogen and kept in a nitrogen atmosphere throughout the polymerization. The N-vinylformamide solution (15g in 30g of water) was degassed and added to the reactor at the rate of 2.5 ml/min with vigorous agitation. (The N-vinylformamide was purified by vacuum distillation at 70° C., 1 torr, prior to use.) While the reaction mixture was heated to 50° C., 2,2'-azobis(2,4-dimethylpentanitrile) (Vazo 52 initiator, 0.05g) was charged. After 3 hours at 50° C. with agitation, a stable polymeric emulsion was produced having a viscosity of 3 cps. The solid polymer product was recovered by breaking the emulsion by the addition of acetone. The isolated N-vinylformamide homopolymer had a molecular weight of $6.7 \times 10^6$ as measured by light scattering and a viscosity of 21,000 cps as a 5% aqueous solution.

EXAMPLE 2

The vinylformamide homopolymer (10g) of Example 1 was dissolved in water (990g) and then mixed with 50% aqueous sodium hydroxide (11.3g). The resulting mixture was heated for 8 hours at 80° C. under a nitrogen atmosphere. To the reaction mixture was added concentrated hydrochloric acid until the polymer precipitated. The acid solution was decanted. The precipitated polymer was redissolved in water and reprecipitated with methanol. The vinylamine homopolymer hydrochloride salt had a viscosity of 400 cps at 1% aqueous solution.

EXAMPLE 3

This Example shows the preparation of a very high molecular weight poly(N-vinylacetamide) by inverse emulsion polymerization.

The N-vinylacetamide was prepared according to the method taught in U.S. Pat. No. 4,018,826. The N-vinylacetamide was purified as follows: The crude N-vinylacetamide (1 kg) was flash distilled at 70°–74° C., 1 torr. Approximately two-thirds of the material was distilled to give a 70:30 N-vinylacetamide/acetamide mixture. This mixture (100g) and toluene (600g) were placed in a 1000 ml beaker and the resulting mixture was stirred well. The yellow toluene solution was decanted from insoluble solids which were washed twice with 50g of fresh toluene. The toluene solutions were combined and washed with 25g of brine. The yellow brine solution was discarded. The toluene solution was then extracted four times with 130 ml of water. The aqueous solution was back extracted with 25 ml of methylene chloride. The methylene chloride solution was discarded. The aqueous solution was saturated with sodium chloride and extracted four times with 330 ml methylene chloride. After removing the methylene chloride under reduced pressure, 42g of pure N-vinylacetamide (60% recovery) was obtained.

A mixture of N-vinylacetamide (15g), water (45g), xylene (90g), and SPAN 60 surfactant (4g) was polymerized in the same manner as described in Example 1, using 2,2'-azobis(2-methylpropionitrile) AIBN (0.08g) as an initiator. The N-vinylacetamide homopolymer was precipitated by addition of acetone, and had a molecular weight of $1.5 \times 10^6$, as determined by gel permeation chromatography.

EXAMPLE 4

The N-vinylacetamide homopolymer of Example 3 (10 g) was dissolved in water and mixed with concentrated hydrochloric acid (2 mole equivalents). The resulting mixture was heated to reflux (about 110° C.) for 48 hours. To the reaction mixture was added concentrated hydrochloric acid until the polymer precipitated. The acid solution was decanted. The precipitated polymer was redissolved in water and reprecipitated with methanol yielding 8.8g of produce having a viscosity of 324 cps as a 1% aqueous solution.

EXAMPLES 5–9

N-vinylformamide (NVF) was polymerized in the same manner as described in Example 1. The data regarding the polymerization recipes and the resulting emulsions are set forth in Tables 1 and 2, respectively.

TABLE 1

| EXAMPLE | NVF (g) | WATER (g) | HYDROCARBON (g) | SPAN 60 (g) | VAZO 52 (g) | ADDITIVE (g) |
|---|---|---|---|---|---|---|
| 5 | 15 | 30 | Octane 55 | 2.5 | 0.05 | — |
| 6 | 15 | 30 | Octane 55 | 2.5 | 0.05 | 0.25 Vinol 125 |
| 7 | 15 | 10 | Octane 75 | 2.5 | 0.05 | — |
| 8 | 15 | 30 | Hexane 90 | 2.5 | 0.05 | — |
| 9 | 15 | 30 | Hexane 90 | 2.5 | 0.05 | 0.25 Poly(vinylamine) |

TABLE 2

| EXAMPLE | EMULSION VISCOSITY (cps) | HOMOPOLYMER MOLECULAR WEIGHT |
|---|---|---|
| 5 | 4 | $7 \times 10^6$ |
| 6 | 4 | $7 \times 10^6$ |
| 7 | 4 | $6 \times 10^6$ |
| 8 | 4 | $6 \times 10^6$ |
| 9 | 4 | $6 \times 10^6$ |

EXAMPLE 10

In this example the inverse emulsion polymerization of N-vinylformamide according to Example 1 was attempted using toluene, xylene and kerosene individually as the hydrocarbon liquid phase. In each instance a high molecular weight N-vinylformamide polymer was obtained, but the emulsions were unstable and broke.

EXAMPLE 11

This example shows the need to use an azo-type initiator. Following the procedure of Example 1 using sodium or ammonium persulfate as the initiator resulted in failure in that no polymer was obtained. This failure is believed due to a possible redox reaction occurring between the monomer and the persulfate.

EXAMPLE 12

In this example poly(N-vinylformamide) was prepared according to the solution polymerization procedure of Example 12 in U.S. Pat. No. 4,421,602. The isolated polymer was determined as having a molecular weight of $1.4 \times 10^5$ by aqueous gas phase chromatography (GPC).

EXAMPLE 13

A poly(N-vinylformamide) emulsion was prepared according to the procedure of Example 69 in U.S. Pat. No. 4,500,437. The resultant polymer emulsion was paste-like and unstable. The isolated poly(N-vinylformamide) had a molecular weight of $5.1 \times 10^5$ as determined by aqueous GPC.

EXAMPLE 14

The polymerization of N-vinylformamide was performed according to the procedure of Example 20 in U.S. Pat. No. 4,500,437. The product was a viscous liquid indicating a molecular weight of less than $5 \times 10^3$.

EXAMPLE 16

This Example shows the application of a poly(vinylamine) according to the invention in enhanced oil recovery. Two vinylamine homopolymers and two commercially available polymers, namely xanthan and a hydrolyzed polyacrylamide, were evaluated at 1500 ppm in synthetic sea water using a low shear Brookfield viscosity at $7.9 \sec^{-1}$.

TABLE 3

Low Shear Rheology in Sea Water[a]

| Polymer | Conc (ppm) | Brookfield Viscosity (cps)[b] | |
|---|---|---|---|
| | | R.T. | 90° C. |
| Vinylamine (7 MM) | 1500 | 16 | 13 |
| Vinylamine (0.6 MM) | 1500 | 6 | 2 |
| Xanthan XC (2 MM) | 1500 | 50 | 4 |
| Hydrolyzed Polyacrylamide (2 MM) | 1500 | 15 | 3 |

[a]Sea Water = 3% NaCl + 0.3% CaCl$_2$; pH = 6
[b]Model LVF, $7.9 \sec^{-1}$

It can be seen from Table 3 that the vinylamine homopolymer of about $7 \times 10^6$ molecular weight outperformed the commercially available polymers as well as the lower molecular weight poly(vinylamine). The vinylamine homopolymer demonstrated much improved viscosity stability at the elevated (90° C.) temperature compared to the other polymers.

EXAMPLE 17

In this Example the very high and the low molecular weight vinylamine (VAm) homopolymers were compared the guar having a molecular weight of about 2MM for use in a fracture acidizing composition. The polymer concentration was 0.5% and the viscosity was measured using a FANN 35 viscometer, R$_1$B$_1$ sensor at $510 \sec^{-1}$.

TABLE 4

| | Fracture Acidizing | | | | | |
|---|---|---|---|---|---|---|
| | Room Temperature | | | 70° C. - 3 HR | | |
| % HCl | VAm (0.6 MM) | VAm (7 MM) | Guar | VAm (0.6 MM) | VAm (7 MM) | Guar |
| 0 | 28 | 129 | 37 | 18 | 68 | 34 |
| 10 | 10 | 22 | 26 | 3 | 12.5 | 2 |
| 15 | 6 | 6.5 | 11 | 2 | 9 | 2 |

The 7 million molecular weight vinylamine homopolymer had the higher viscosity behavior compared to the lower molecular weight homopolymer and also outperformed the commercially available control, i.e. guar, at higher temperature.

EXAMPLE 18

In this Example the enhanced performance of a drilling mud containing a vinylamine homopolymer of the invention was demonstrated.

A typical drilling mud formulation can be prepared as follows:

Clay Dispersion A:
11.1g Aqua Gel Gold Seal Bentonite Clay
8g Potassium chloride
400g Water
Clay is dispersed to hydrate overnight.

Polymer Solution B:
2g of polymer are dissolved in 400g water, mixed for 2 to 4 hours and pH adjusted to 6.

Dispersion A (200g) is added to polymer solution B (200g) and mixed for 4 hours. Rheology measurements were made using a FANN-35 viscometer at 300 and 600 rpm using standard API procedure.

TABLE 5

| Polymer | Apparent Viscosity (cps) | Plastic Viscosity (cps) | Gel Strength 10 sec/10 min | Yield Point lb/100 ft$^2$ |
|---|---|---|---|---|
| VAm (80 M) | 3.7 | 2.5 | 0 | 2.5 |
| VAm (0.6 MM) | 6.0 | 4.5 | 0 | 3.0 |
| VAm (7 MM) | 14.0 | 11.0 | ¾ | 6.0 |
| Xanthan (2 MM) | 8.8 | 5.5 | ¾ | 6.5 |

Table 5 shows that the very high molecular weight vinylamine homopolymer had the best performance at room temperature.

EXAMPLE 19

The high molecular weight vinylamine homopolymer demonstrated a surprisingly high viscosity in saturated brine solutions. This property is important in completion fluids used in oil wells.

The saturated salt solution was prepared by mixing 1g of a polymer into 100g of saturated salt solution and measuring the viscosity.

TABLE 6

| | Viscosity in Saturated Salt Solution (cps) | |
|---|---|---|
| Polymer | NaCl | CaCl$_2$ |
| VAm (0.6 MM) | 3 | 100 |
| VAm (7 MM) | 11.5 | 300 |
| Hercules 250 HHR (2-4 MM) Hydroxyethylcellulose | 4 | 250 |

EXAMPLE 20

This Example demonstrates the use of the vinylamine homopolymer as a dry strength additive in paper making application.

Paper chromatography grade stock of uniform size was immersed in water, metered through squeeze rolls and weighed. Water pick-up was calculated and determined consistent from sheet to sheet. The weight of polymer required per unit water volume to impart 0.5% polymer pick-up on sheet weight (dry/dry) was determined.

The low molecular weight (80M) vinylamine homopolymer and polyvinyl alcohol were applied at 0.75%. The high molecular weight (7MM) vinylamine homopolymer which was an extremely high 3200 cps in viscosity was diluted to 0.188% solids and assumed to be 0.125%, the add-on level of the others. The polymers were adjusted to pH 4.5 prior to sheet saturation.

TABLE 7

| Polymer Saturant | Instron Tensile lb/in | Mullen Burst lb/in$^2$ | Tear CMD |
|---|---|---|---|
| Blank | 11.5 | 0.6 | 71 |
| VAm (80 M) | 13.5 | 2.5 | 77 |
| VAm (7 MM)$^a$ | 14.5 | 3.1 | 89 |
| VINOL 107 PVOH$^b$ (60 M) | 12.5 | 2.0 | 80 |

$^a$0.125% add-on compared to 0.5% for the others.
$^b$Polyvinyl alcohol marketed by Air Products and Chemicals, Inc.

It can be seen that the very high molecular weight vinylamine homopolymer was an effective dry strength additive in papermaking at ¼ the dosage compared to the low molecular weight vinylamine homopolymer.

EXAMPLE 21

This Example shows the retention characteristics of the vinylamine homopolymer in papermaking.

Immediately prior to hand sheet preparations, softwood and hardwood bleached kraft pulps were each suspended at 1.5% consistency in deionized water. The pulps were then blended 1:1 by weight and an amount equivalent to 30g (oven dry basis) was utilized in preparing each set of hand sheets. Ten percent of anatase $TiO_2$ based on fiber weight was added followed by 5 minutes of stirring. (The $TiO_2$ was predispersed at 10% solids in deionized water). Sufficient pulp to form a 2.5g hand sheet was removed and treated with polymer followed by 30 seconds of moderate stirring. The treated fiber suspension was then added to a Noble and Wood sheet mold containing sufficient dionized water to provide a forming consistency of 0.04%. Hand sheets formed from the fiber suspensions were pressed 5 minutes at 50 psig between blotter stock and then drum dried 7 minutes at 220° F. in contact with one blotter.

Following this procedure the polymers were added to the fiber suspension at 0.5% consistency at addition levels of 0, 0.01, 0.05, 0.1, 0.2 and 1% based on fiber. The pH was maintained at 5. Hand sheets prepared in the manner described were conditioned at 50% RH and 73° F. and tested for filler retention using TAPPI standard method.

TABLE 8

| Polymer | % $TiO_2$ Retention |
|---|---|
| VAm (7 MM) | 93.1 |
| VAm (80 M) | 83.3 |
| Hercules 834 Heterofloc High Mol. Wt./High Charge Density, PAM (2-4 MM) | 85.6 |
| Allied Colloid DSR 1256 Low Mol. Wt./Low Charge Density, PAM (<1 MM) | 54.0 |

PAM = Polyacrylamide

It can be seen that the 7MM molecular weight poly(vinylamine) demonstrated a superior $TiO_2$ retention at 0.1–0.2% addition level to wood pulp.

STATEMENT OF INDUSTRIAL APPLICATION

The present invention provides very high molecular weight poly(Nvinylamides) by inverse emulsion polymerization and derived poly(vinylamines) having applications in water treatment, enhanced oil recovery and papermaking fields.

We claim:

1. An acidized fracturing fluid consisting essentially of 5 to 28% aqueous hydrochloric acid containing 0.2 to 2% by weight poly(vinylamide) of at least $10^6$ average molecular weight and greater than 50% hydrolyzed to vinylamine units, the fluid having a FANN 35 viscosity of 10 to 100 cps at 300 rpm, 510 sec$^{-1}$ and $R_1B_1$ sensor.

2. The acidized fracturing fluid of claim 1 in which the poly(vinylamide) has a 3 to $15 \times 10^6$ average molecular weight before hydrolysis.

3. The acidized fracturing fluid of claim 1 in which the poly(vinylamide) is greater than about 90% hydrolyzed to vinylamine units.

4. The acidized fracturing fluid of claim 1 which also contains 0.5 to 1% crosslinking agent for the vinylamine units, based on weight of the poly(vinylamide).

5. The acidized fracturing fluid of claim 3 which contains 0.5% by weight of a hydrolyzed poly(vinylamide) of 1.8 to $9 \times 10^6$ average molecular weight.

6. In an acidized fracturing fluid comprising aqueous hydrochloric acid and a viscosifier, the improvement which comprises as the viscosifier 0.2 to 2% by weight poly(vinylamide) of at least $10^6$ average molecular weight and greater than about 90% hydrolyzed to vinylamine units.

7. The fluid of claim 6 in which the poly(vinylamide) has a 3 to $15 \times 10^6$ average molecular weight before hydrolysis.

8. The fluid of claim 7 which also contains 0.5 to 1% crosslinking agent for the vinylamine units, based on weight of the poly(vinylamide).

9. The fluid of claim 8 which contains about 0.5% by weight of a hydrolyzed poly(vinylamide) of 1.8 to $9 \times 10^6$ average molecular weight.

10. The fluid of claim 7 in which the poly(vinylamide) is about 99+% hydrolyzed to vinylamine units.

* * * * *